(12) United States Patent
Kardos et al.

(10) Patent No.: US 8,960,168 B2
(45) Date of Patent: Feb. 24, 2015

(54) ARRANGEMENT FOR COOLING OF RECIRCULATING EXHAUST GASES OF A COMBUSTION ENGINE

(75) Inventors: Zoltan Kardos, Södertälje (SE); Erik Söderberg, Stockholm (SE); Rolf Dybdal, Jönåker (SE)

(73) Assignee: Scania CB AB (SE)

( * ) Notice: Subject to any disclaimer, the term of this patent is extended or adjusted under 35 U.S.C. 154(b) by 169 days.

(21) Appl. No.: 13/254,213

(22) PCT Filed: Mar. 1, 2010

(86) PCT No.: PCT/SE2010/050230
§ 371 (c)(1),
(2), (4) Date: Sep. 1, 2011

(87) PCT Pub. No.: WO2010/104452
PCT Pub. Date: Sep. 16, 2010

(65) Prior Publication Data
US 2011/0315130 A1 Dec. 29, 2011

(30) Foreign Application Priority Data

Mar. 13, 2009 (SE) .......................... 0950150

(51) Int. Cl.
| | | |
|---|---|---|
| F02M 25/07 | (2006.01) | |
| F02B 47/08 | (2006.01) | |
| F01N 3/035 | (2006.01) | |
| F01N 3/023 | (2006.01) | |
| F01N 3/20 | (2006.01) | |

(Continued)

(52) U.S. Cl.
CPC .................. *F01N 3/035* (2013.01); *F01N 3/023* (2013.01); *F01N 3/2006* (2013.01); *F01N 3/34* (2013.01);

(Continued)

(58) Field of Classification Search
USPC ................. 60/278, 280, 298, 605.2; 123/542, 123/568.11, 568.12, 559.1; 701/108
See application file for complete search history.

(56) References Cited

U.S. PATENT DOCUMENTS 6,216,458 B1 *  4/2001  Alger et al. .................. 60/605.2
7,617,679 B2 *  11/2009  Kardos et al. ............... 60/605.2

(Continued)

FOREIGN PATENT DOCUMENTS

| DE | 102008027883 A | 12/2009 |
|---|---|---|
| JP | 2002/195106 A | 7/2002 |

(Continued)

OTHER PUBLICATIONS

Venturi Jet Pumps Ltd, Steam Jet Ejectors, Nov. 18, 2008, p. 1.*

(Continued)

*Primary Examiner* — Thomas Moulis
*Assistant Examiner* — Elizabeth Hadley
(74) *Attorney, Agent, or Firm* — Ostrolenk Faber LLP

(57) ABSTRACT

An arrangement for cooling of recirculating exhaust gases of a combustion engine (2) in a vehicle (1). The arrangement comprises a first EGR cooler (14), a driving means (15, 31) adapted to driving air through the first EGR cooler (14) in order to cool the exhaust gases in a return line (11) which are subjected to a first step of cooling in the first EGR cooler (14), and at least one second EGR cooler (19, 20) in which the exhaust gases in the return line (11) are intended to undergo a second step of cooling. The arrangement comprises an air line (16) which extends at least from the first EGR cooler (14) to the exhaust pipe (4) at a location between the turbine (5) and the exhaust-treating component (18*a*, 18*b*), which air line (16) is adapted to leading warm air from the first EGR cooler (14) into the exhaust line (4) at said location.

17 Claims, 3 Drawing Sheets

(51) Int. Cl.
*F01N 3/34* (2006.01)
*F01N 13/00* (2010.01)
*F01N 3/033* (2006.01)
*F02B 37/00* (2006.01)

(52) U.S. Cl.
CPC ....... *F02M 25/0707* (2013.01); *F02M 25/0727* (2013.01); *F01N 13/0097* (2013.01); *F01N 3/0335* (2013.01); *F01N 2470/30* (2013.01); *F02B 37/00* (2013.01); *Y02T 10/121* (2013.01); *Y02T 10/26* (2013.01)
USPC ................. 123/568.12; 123/568.11; 60/605.2

(56) References Cited

U.S. PATENT DOCUMENTS 8,028,522 B2 * 10/2011 Irmler et al. .................... 60/599
8,627,807 B2 * 1/2014 Wikstrom ................ 123/568.12
8,695,340 B2 * 4/2014 Kardos et al. ................ 60/605.2
2007/0039321 A1 * 2/2007 Sheidler et al. ................ 60/599
2007/0089716 A1 4/2007 Saele
2008/0256949 A1 10/2008 Wikstrom et al.
2010/0050634 A1 * 3/2010 Yager ........................... 60/605.2

FOREIGN PATENT DOCUMENTS

JP 2006/070854 A 3/2006
WO WO 2007/073769 A1 7/2007

OTHER PUBLICATIONS

International Search Report dated May 27, 2010, issued in corresponding international application No. PCT/SE2010/050230.

* cited by examiner

ARRANGEMENT FOR COOLING OF RECIRCULATING EXHAUST GASES OF A COMBUSTION ENGINE

CROSS-REFERENCE TO RELATED APPLICATIONS

The present application is a 35 U.S.C. §§371 national phase conversion of PCT/SE2010/050230, filed Mar. 1, 2010, which claims priority of Swedish Application No. 0950150-3, filed Mar. 13, 2009, the contents of which are incorporated by reference herein. The PCT International Application was published in the English language.

BACKGROUND TO THE INVENTION, AND STATE OF THE ART

The present invention relates to an arrangement for cooling of recirculating exhaust gases of a combustion engine.

The technique called EGR (exhaust gas recirculation) is a known way of recirculating part of the exhaust gases in an exhaust line of a combustion engine. The recirculating exhaust gases are led through a return line and mixed with inlet air for the combustion engine before the mixture is led to the cylinders of the combustion engine. Adding exhaust gases to the air causes a lower combustion temperature resulting inter alia in a reduced content of nitrogen oxides $NO_x$ in the exhaust gases. This technique is used both for Otto engines and for diesel engines. The amount of exhaust gases which can be supplied to a combustion engine depends on the pressure and temperature of the exhaust gases. Supplying as large an amount of exhaust gases to the combustion engine as possible entails effective cooling of the exhaust gases before they are led to the combustion engine. A known practice is to cool the recirculating exhaust gases in one or more EGR coolers before they are led to the combustion engine.

During operation of combustion engines, e.g. diesel engines, the exhaust gases will be at a temperature ranging from 150° C. to 600° C. The temperature of the exhaust gases will vary with the load on the combustion engine. In cases where the combustion engine's cooling system is used for cooling the recirculating exhaust gases, the cooling system will thus be subject to high load peaks at times when the combustion engine is under great load. In heavy vehicles, the combustion engine's cooling system is commonly used also for other cooling requirements in the vehicle, e.g. cooling the oil of a hydraulic retarder. It is therefore desirable to reduce the load on the combustion engine's cooling system.

US 2008/0256949 refers to an arrangement for recirculation of exhaust gases whereby the recirculating exhaust gases undergo a first step of cooling in an air-cooled EGR cooler arranged in an engine space in the vehicle. To this end, a fan blows a cooling air flow through the EGR cooler. The recirculating exhaust gases are thereafter subjected to a second step of cooling by coolant in a low-temperature cooling system. In this case the air present in the engine space is used for subjecting the recirculating exhaust gases to a first step of cooling. As the recirculating exhaust gases may be at a very high temperature, the air at least locally in the engine space may be warmed to a very high temperature. The high air temperature may cause damage to nearby components in the engine space.

The exhaust line in a vehicle normally comprises one or more components for post-treatment of the exhaust gases before they are discharged to surrounding air. Such a component may be a catalyst adapted to removing nitrogen oxides $NO_x$ from the exhaust gases. However, most types of catalysts need to be at a lowest acceptable temperature for them to be able to effect optimum removal of nitrogen oxides $NO_x$ from the exhaust gases. An SCR (selective catalytic reduction) catalyst requires, for example, a temperature of about 200° C. Another component for post-treatment of the exhaust gases of diesel engines is a particle filter adapted to intercepting and burning soot particles in the exhaust gases. The particle filter likewise needs to be at a lowest acceptable temperature for it to function satisfactorily.

In supercharged combustion engines, the exhaust gases are led through a turbine. When the exhaust gases have given off energy in the turbine, they will be at a reduced pressure and a reduced temperature. In certain operating states of the combustion engine, the temperature of the exhaust gases after the turbine may be so low that the catalyst cannot maintain a lowest acceptable temperature and effect optimum cleaning of the exhaust gases.

SUMMARY OF THE INVENTION

The object of the present invention is to propose an arrangement of the kind mentioned in the introduction which comprises an air-cooled EGR cooler in which the warm air resulting from the cooling of the recirculating exhaust gases in the first EGR cooler is utilised in a way which promotes the exhaust treatment of the combustion engine.

This object is achieved with the arrangement of the kind mentioned in the introduction which is characterised by a first EGR cooler positioned and configured to subject the exhaust gases in the return line to a first step of cooling; an air driving device configured for driving air through the first EGR cooler and thus yielding warm air; and at least one second EGR cooler positioned in the return line and configured to subject the exhaust gases in the return line to a second step of cooling; an air line which extends at least from the first EGR cooler to a location of the exhaust line between the turbine and the exhaust-treating component, the air line is configured for leading the warm air from the first EGR cooler into the exhaust line at the location; and the first EGR cooler is dimensioned, configured and operable so that the warm air is warmed up in the first EGR cooler to a higher temperature than the temperature of the exhaust gases in the exhaust line downstream of the turbine. With such an air-cooled first EGR cooler the arrangement can effect a good first step of cooling of the exhaust gases. The exhaust gases can here be cooled to a relatively low temperature before they are led into the second EGR cooler. The load on the cooling system which cools the recirculating exhaust gases in the second EGR cooler is thereby markedly reduced. The exhaust gases in the exhaust line will thus assume a reduced temperature when they expand through the turbine. In certain operating situations the temperature of the exhaust gases after the turbine may drop to such a level that they do not maintain a lowest acceptable temperature of the exhaust-treating component. However, the recirculating exhaust gases led into the return line will be at a higher temperature, since they are taken from the exhaust line at a location upstream of the turbine. The air which cools the recirculating exhaust gases may be warmed to a temperature close to the temperature of the recirculating exhaust gases. With a well-dimensioned first EGR cooler the air may be warmed to a higher temperature than the temperature of the exhaust gases in the exhaust line downstream of the turbine. Leading this warm air into the exhaust line downstream of the turbine will provide the exhaust gases with a warming and the exhaust-treating component with a raised temperature. Most exhaust-treating components require a lowest acceptable temperature in order to maintain an optimum exhaust-treating action. The raised temperature achieved for the exhaust-treating component by the present invention results in the exhaust-treating component being able to effect optimum exhaust treatment during a larger part of the combustion engine's operating time. Leading the warm air away from the engine space into the exhaust line provides assurance that the air in the engine space will not be warmed to such a level that damage might be caused to temperature-sensitive components in the engine space.

According to an embodiment of the present invention, the driving means is a fan. A fan may be situated at a suitable location in the air line or close to the first EGR cooler. The fan will be so dimensioned that it is able to provide a desired air flow through the first EGR cooler and push the air into the exhaust line. Alternatively, the drive means may be an ejector pump device situated in the exhaust pipe close to the outlet aperture of the air line. By such an ejector pump device a negative pressure can be created in the air line close to the exhaust line when exhaust gases flow through the ejector pump device. It is thus possible to create an air flow through the first EGR cooler into the exhaust line.

According to a preferred embodiment of the present invention, the air line comprises an inlet aperture whereby air is intended to be drawn in and led to the EGR cooler from a region with air at the temperature of the surroundings. The recirculating exhaust gases can effect very good cooling if they are cooled by air at the temperature of the surroundings. The inlet of the air line may be situated in a wheel housing of the vehicle. A relatively short air line may here run from the wheel housing to the first EGR cooler. Alternatively, the inlet aperture of the air line may be situated at a front portion of the vehicle. In such cases, the inlet apertures of the air lines need to be covered by a grille or the like to prevent particles and dirt from being drawn into the air line. The first EGR cooler is situated with advantage in an engine space in the vehicle. The air will be at a raised temperature relative to surrounding air during operation of the combustion engine, but can be used for acceptable cooling of the exhaust gases in the first EGR cooler when they are at a significantly higher temperature than the air in the engine space. In this case the air line need only extend from the first EGR cooler to said location in the exhaust line.

According an embodiment of the present invention, said exhaust-treating component is a catalyst. Catalysts need a relatively high temperature for their optimum functioning. Adding warm air to the exhaust gases in the exhaust line upstream of the catalyst results in a raised catalyst temperature and optimum removal of nitrogen oxides during a larger part of the combustion engine's operating time. Alternatively, the exhaust-treating component may be a particle filter. In diesel engines, soot particles are removed from the exhaust gases by particle filters. For soot particles intercepted in the particle filter to burn, the particle filter needs to be at a sufficiently high temperature. Adding warm air to the exhaust gases in the exhaust line upstream of the particle filter results in increased combustion of intercepted soot particles.

According to another embodiment of the invention, the recirculating exhaust gases are intended to be subjected to a second step of cooling in the second EGR cooler by coolant from the combustion engine's cooling system. The cooling system which cools the combustion engine is an already existing cooling system which is also used with advantage for cooling the recirculating exhaust gases. During normal operation, the coolant in the combustion engine's cooling system will be at a temperature of 80-100° C. It is therefore possible to use the coolant in the combustion engine's cooling system to cool the recirculating exhaust gases to a corresponding temperature. As the recirculating exhaust gases will have already undergone a first step of cooling in the first EGR cooler, the result in this case is relatively moderate load on the combustion engine's cooling system. As the primary purpose of this cooling system is to cool the combustion engine, it should not be subjected to too great a load of other cooling duties, since this might result in impairment of the cooling of the combustion engine in such circumstances.

According to another preferred embodiment of the invention, the arrangement comprises a third EGR cooler in which the recirculating exhaust gases are intended to be subjected to a third step of cooling by a coolant which will be at a lower temperature during operation of the combustion engine than the coolant in the combustion engine's cooling system. As the coolant in the combustion engine's cooling system has an operating temperature of 80-100° C., the exhaust gases can only be cooled to a temperature close to the temperature of the coolant in the second EGR cooler. It is often desirable to cool the exhaust gases to a lower temperature. To this end, the recirculating exhaust gases may be cooled in a third EGR cooler by coolant in a low-temperature cooling system in which the coolant is at a lower temperature than the coolant in the combustion engine's cooling system. Such a low-temperature cooling system may comprise a radiator element in which the coolant in the cooling system is cooled by air at the temperature of the surroundings. The coolant in the low-temperature cooling system may thus assume a temperature close to the temperature of the surroundings. The exhaust gases can thus be cooled to a relatively low temperature before they are mixed with air and led to the combustion engine. Alternatively, the exhaust gases may undergo a third step of cooling in a third EGR cooler which is air-cooled, in which case they are with advantage cooled by air at the temperature of the surroundings.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
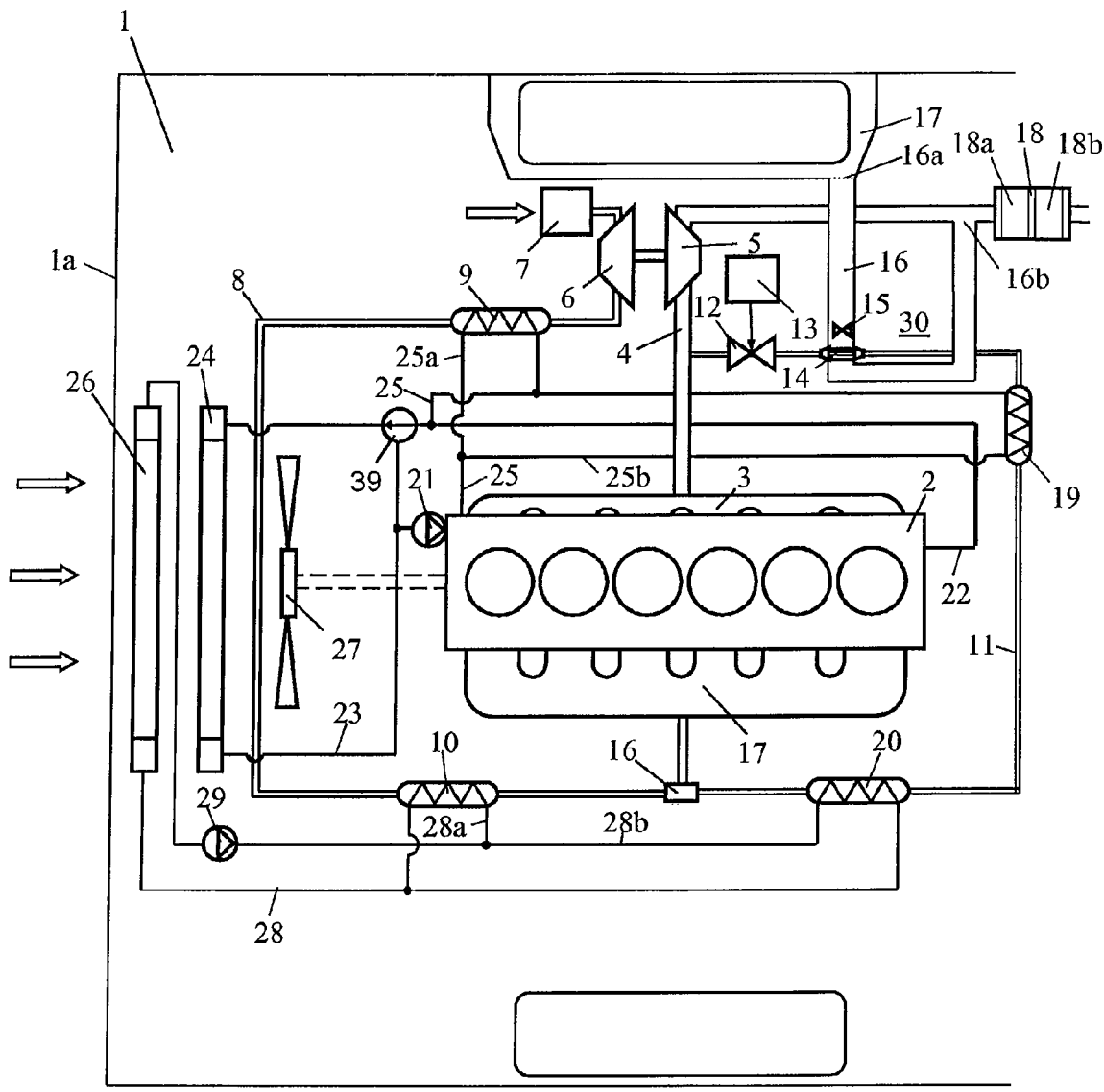
FIG. 1 depicts an arrangement for cooling of recirculating exhaust gases of a diesel engine according to a first embodiment of the invention.

FIG. 1 depicts an arrangement for a supercharged combustion engine which is intended to power a schematically depicted vehicle 1. The combustion engine is here exemplified as a diesel engine 2. The diesel engine 2 may be intended to power a heavy vehicle 1. The exhaust gases from the cylinders of the diesel engine 2 are led via an exhaust manifold 3 to an exhaust line 4. The diesel engine 2 is provided with a turbo unit which comprises a turbine 5 and a compressor 6. The exhaust gases in the exhaust line 4, which will be at above atmospheric pressure, are led initially to the turbine 5. The turbine 5 is thus provided with driving power which is transferred, via a connection, to the compressor 6. The compressor 6 uses this power to compress air which is drawn into an air inlet line 8 via an air filter 7. The air in the inlet line is cooled initially in a first coolant-cooled charge air cooler 9.

The air is cooled in the first charge air cooler 9 by coolant from the combustion engine's cooling system. The compressed air is thereafter cooled in a second coolant-cooled charge air cooler 10. The air is cooled in the second charge air cooler 10 by coolant from a low-temperature cooling system.

The arrangement comprises a return line 11 for effecting recirculation of part of the exhaust gases in the exhaust line 4. The return line 11 has an extent from the exhaust line 4 at a location upstream of the turbine 5 to the inlet line 8. The return line 11 comprises an EGR valve 12 by which the exhaust flow in the return line 11 can be shut off. The EGR valve 12 may also be used for steplessly controlling the amount of exhaust gases which is led from the exhaust line 4 to the inlet line 8 via the return line 11. A control unit 13 is adapted to controlling the EGR valve 12 on the basis of information about the current operating state of the diesel engine 2. The return line 11 comprises a first air-cooled EGR cooler 14 adapted to subjecting the exhaust gases to a first step of cooling. A fan 15 is used to drive an air flow through the first EGR cooler 14. The fan 15 is applied in an air line 16. The air line 16 has an inlet aperture 16a in a wheel housing 17 of the vehicle 1 and an outlet aperture 16b in the exhaust line 4 at a location downstream of the turbine 5 and upstream of a silencer 18. The silencer 18 comprises exhaust-treating components in the form of a catalyst 18a adapted to removing nitrogen oxides from the exhaust gases and a particle filter 18b adapted to removing soot particles from the recirculating exhaust gases. The exhaust gases in the return line 11 are thereafter cooled in a second EGR cooler 19 by coolant from the combustion engine's cooling system. The exhaust gases are finally cooled in a third EGR cooler 20 by coolant from the low-temperature cooling system.

The combustion engine 2 is cooled in a conventional manner by a cooling system which contains a circulating coolant. The coolant in the cooling system is circulated by a coolant pump 21. A main flow of the coolant is circulated through the combustion engine 2. After the coolant has cooled the combustion engine 2, it is led via a line 22 to a thermostat 39 in the cooling system. When the coolant has reached a normal operating temperature, the thermostat 39 is adapted to leading it to a radiator 24 in order to be cooled. The radiator 24 is fitted at a forward portion of the vehicle 1. A smaller portion of the coolant in the cooling system is nevertheless not led back to the combustion engine 2 but is circulated through a line 25 which divides into two parallel lines 25a, 25b. The line 25a leads coolant to the first charge air cooler 9, in which it subjects the compressed air to a first step of cooling. The first charge air cooler 9 takes the form of a counterflow heat exchanger. The compressed air and the coolant thus flow in opposite directions through the first charge air cooler 9. This makes it possible for the compressed air to be cooled to a temperature close to the coolant's inlet temperature in the first charge air cooler 9. The line 25b leads coolant to the second EGR cooler 19, in which it subjects the recirculating exhaust gases to a first step of cooling. The second EGR cooler 19 takes the form of a counterflow heat exchanger. The recirculating exhaust gases and the coolant thus flow in opposite directions through the second EGR cooler 19. This makes it possible for the recirculating exhaust gases to be cooled to a temperature close to the coolant's inlet temperature in the second EGR cooler 19. The coolant which has cooled the air in the first charge air cooler 9 and the coolant which has cooled the exhaust gases in the second EGR cooler 19 are reunited in the line 25, which leads the coolant back to the line 22. The warm coolant is led via the line 22 to the radiator 24.

The low-temperature cooling system comprises a radiator element 26 fitted in front of the radiator 24 in a peripheral region of the vehicle 1. In this case the peripheral region is situated at a front portion 1a of the vehicle 1. A radiator fan 27 is adapted to generating a flow of surrounding air through the radiator element 26 and the radiator 24. As the radiator element 26 is situated in front of the radiator 24, the coolant in the radiator element 26 is cooled by air at the temperature of the surroundings. The coolant in the radiator element 26 can thus be cooled to a temperature close to the temperature of the surroundings. The cold coolant from the radiator element 26 is circulated in the low-temperature cooling system in a line 28 by a pump 29. The line 28 divides into two parallel lines 28a, 28b. The line 28a leads coolant to the second charge air cooler 10, in which it subjects the compressed air to a second step of cooling. The second charge air cooler 10 takes the form of a counterflow heat exchanger. This makes it possible for the compressed air to be cooled to a temperature close to the coolant's inlet temperature in the second charge air cooler 10. The line 28b leads coolant to the third EGR cooler 20, in which it subjects the recirculating exhaust gases to a second step of cooling. The third EGR cooler 20 likewise takes the form of a counterflow heat exchanger. This makes it possible for the recirculating exhaust gases to be cooled to a temperature close to the coolant's inlet temperature in the third EGR cooler 20. After the coolant has passed through the second charge air cooler 10 and the third EGR cooler 20, the lines 28a, 28b reunite. The coolant is thereafter led in the line 28 to the radiator element 26 in order to be cooled.

During operation of the diesel engine 2, exhaust gases flow out from the diesel engine 2 into the exhaust line 4. During most operating states of the diesel engine 2, the control unit 13 keeps the EGR valve 12 open so that part of the exhaust gases in the exhaust line 4 is led into the return line 11. The exhaust gases led into the return line 11 will usually be at a temperature within the range 150° C.-600° C. depending on the diesel engine's operating state. The recirculating exhaust gases in the return line 11 are subjected to a first step of cooling in the first EGR cooler 14 by air drawn by the fan 15 into the air line 16 via the inlet aperture 16a from the wheel housing 17. The inlet aperture 16a is provided with a grille or the like to prevent dirt and particles from being drawn into the air line 16. The air drawn into the air line 16 from the wheel housing will be at substantially the temperature of the surroundings. The fan drives the air through the first EGR cooler 14. The recirculating exhaust gases may for example be cooled by the air so that they will be at a temperature of about 150° C.-200° C. when they leave the first EGR cooler 14. The air which cools the recirculating exhaust gases in the first EGR cooler 14 undergoes a corresponding warming. The air may here be warmed to a temperature close to the temperature which the recirculating exhaust gases are at when they are led into the first EGR cooler 14. The warm air is led out from the air line 16 via an outlet aperture 16b situated in the exhaust line 4 at a location downstream of the turbine 5 and upstream of the silencer 18 which comprises the catalyst 18a and the particle filter 18b. After the exhaust gases have expanded in the turbine 5, they will be at a reduced temperature. The temperature of the exhaust gases in the exhaust line downstream of the turbine 5 will thus usually be significantly lower than the temperature of the warm air in the air line 16. The warm air led into the exhaust line 4 warms the exhaust gases in the exhaust line 4 so that the exhaust gases will be at a raised temperature when they reach the catalyst 18a and the particle filer 18b. Adding the warm air thus results in a raised operating temperature of the catalyst 18a and the particle filter 18b. Catalysts 18a and particle filters 18b have reduced capacity for treating exhaust gases when the operating temperature drops below a lowest acceptable temperature value. Adding warm air to the exhaust line 4 therefore raises the operating temperature in the catalyst 18a and the filter 18b, resulting in their operating temperatures being less frequently below the lowest acceptable temperature value.

After the recirculating exhaust gases have been cooled in the first EGR cooler 14, they are led to the second EGR cooler 19, in which they are cooled by coolant from the combustion engine's cooling system. The coolant will here normally be at a temperature within the range 80° C.-100° C. The recirculating exhaust gases can therefore be cooled to a temperature of about 100° C.-120° C. in the second EGR cooler 19. The recirculating exhaust gases are led finally to the third EGR cooler 20, in which they are subjected to a third step of cooling by coolant from the low-temperature cooling system. The radiator element 26 in the low-temperature cooling system is cooled by air at the temperature of the surroundings which is driven through the radiator element 26 by the radiator fan 27. The coolant in the low-temperature cooling system may thus be at a temperature close to the temperature of the surroundings when it is led into the third EGR cooler 20. The recirculating exhaust gases can therefore be cooled to a temperature close to the temperature of the surroundings in the third EGR cooler 20 before they are mixed with the compressed air which will with advantage have been cooled to a corresponding temperature in the charge air coolers 9, 10. The cooled mixture of exhaust gases and air is led to the diesel engine 2. In operating situations where the diesel engine 2 is under great load, it needs good cooling. The exhaust gases will normally also be at a high temperature in such situations. The initial cooling of the recirculating exhaust gases by the first EGR cooler 14 reduces the temperature of the exhaust gases substantially before they are led to the second EGR cooler 19, in which they are subjected to a second step of cooling by the coolant in the combustion engine's cooling system. With such a first EGR cooler 14 the load on the combustion engine's ordinary cooling system and the low-temperature cooling system can be considerably reduced. The first EGR cooler 14 is mounted on the combustion engine 2 or on the chassis in an engine space 30 in the vehicle 1. The warm air arising when the exhaust gases are cooled in the first EGR cooler 14 is led out from the engine space 30 via the air line 16 and the exhaust line 4. There will therefore be no risk of the temperature in the engine space 30 becoming so high as to cause damage to temperature-sensitive components in the engine space.

Figure 2:
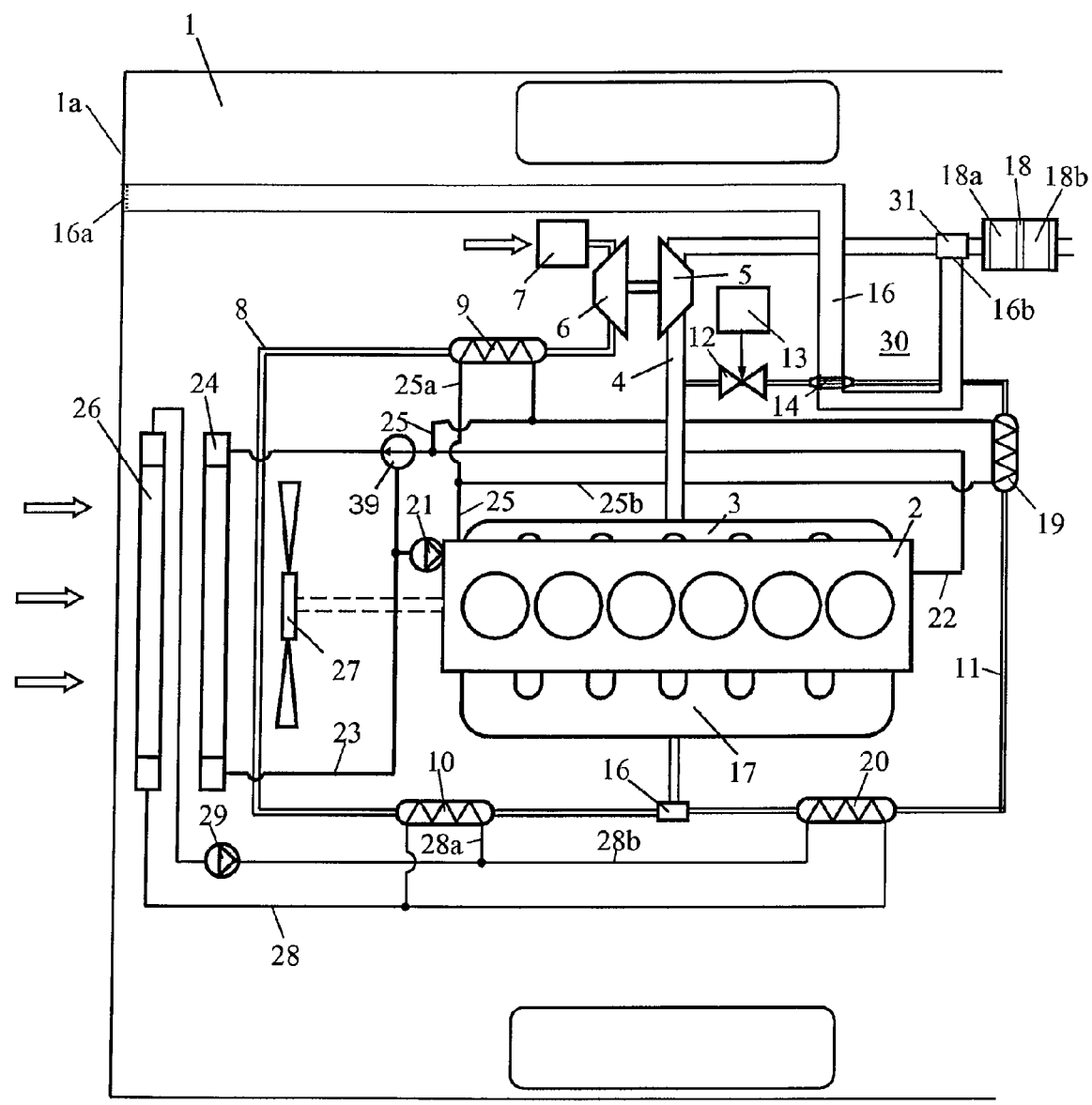
FIG. 2 depicts an arrangement for cooling of recirculating exhaust gases of a diesel engine according to a second embodiment of the invention and FIG. 3 depicts the ejector pump device in FIG. 2 in more detail.
Figure 3:
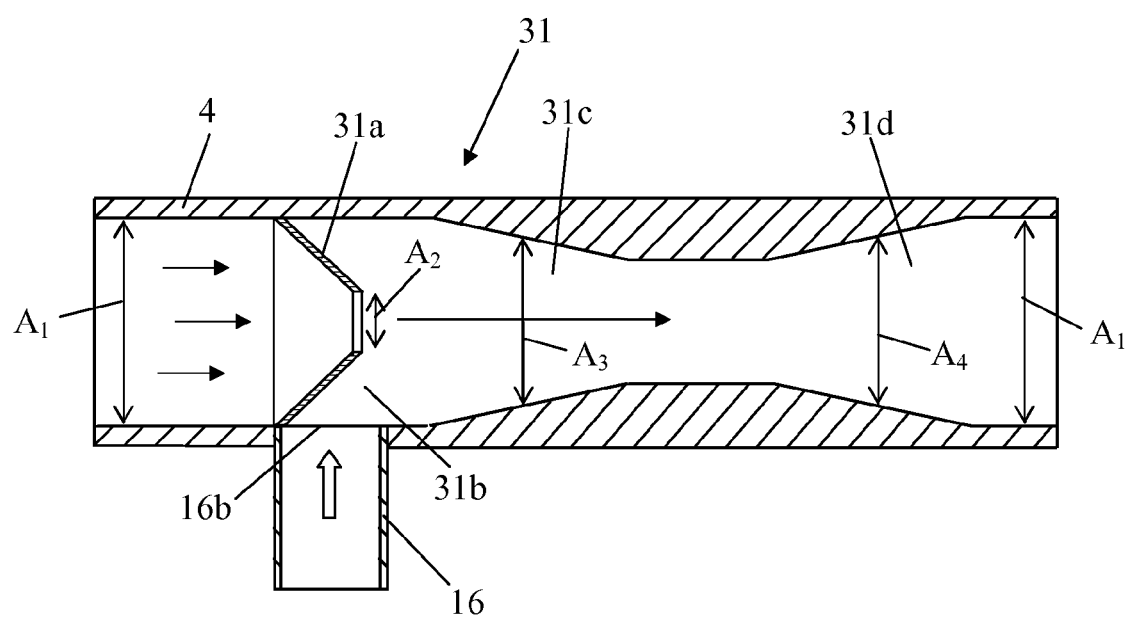

FIG. 2 depicts an alternative embodiment of the arrangement for cooling the recirculating exhaust gases. In this case an ejector pump device 31 is used to draw air through an air line 16 and a first EGR cooler 14. In this case air is drawn in from a region at a front portion 1a of the vehicle 1. The air line 16 comprises a grille or the like at the inlet aperture 16a to prevent dirt and particles from being drawn into the air line 16. After the air has passed through the first EGR cooler 14 and has subjected the recirculating exhaust gases to a first step of cooling, the warm air is led into the exhaust line 4 at a location downstream of the turbine 5 and upstream of the silencer 18. FIG. 3 shows how the ejector pump device 31 may be configured in more detail. The exhaust line 4 upstream and downstream of the ejector pump device 31 has a substantially constant internal cross-sectional area $A_1$. The ejector pump device 31 comprises a nozzle 31a which defines a progressively decreasing cross-section for the exhaust gases when they flow through the ejector pump device 31. The nozzle 31a has an outlet aperture for the exhaust gases which has a cross-sectional area $A_2$ which is considerably smaller than the cross-sectional area $A_1$ of the exhaust line upstream of the ejector pump device 31. The air line 16 is connected to the ejector pump device 31 via the outlet aperture 16b situated at a location radially external to the outlet aperture of the nozzle 31a. The outlet aperture leads to a low-pressure region 31b of the ejector pump device 31. The ejector pump device 31 comprises at a location downstream of the nozzle 31a a converging portion 31c with a cross-sectional area $A_3$ which decreases in the exhaust flow direction. The ejector pump device 31 comprises finally a diverging portion 31d with an increasing cross-sectional area $A_4$ in the exhaust flow direction. Downstream of the diverging portion 31d the exhaust line 4 reverts to its original internal cross-sectional area $A_1$.

When they reach the ejector pump device 31, the exhaust gases in the exhaust line 4 acquire an increased velocity when they flow through the nozzle 31a, which thus defines a flow section with a decreasing cross-sectional area. The exhaust gases will thus have an increased velocity when they leave the nozzle 31a. A low static pressure in a low-pressure region 31b which is situated round the nozzle 31a. The low static pressure results in air being drawn into the low-pressure region 31b from the air line 16 via the outlet aperture 16b situated radially externally to the nozzle 31a. The air drawn into the low-pressure region 31b is carried by the exhaust flow into the converging section 31c of the ejector pump device 31. In the converging section 31c the air acquires a velocity increase. The velocity increase in the converging section 31c increases further the ability of the ejector pump device 31 to draw air into the exhaust line 4 and hence also the ability to draw air through the air line 16 and the EGR cooler 14. The velocity of the exhaust gases and the air decreases thereafter in the diverging section 31d of the ejector pump device 31. Thereafter the mixture of exhaust gases and warm air leaves the ejector pump device 31 and proceeds in the exhaust line 4, which has the cross-sectional area $A_1$, to the silencer 18. In this case the recirculating exhaust gases are thus subjected to a first step of cooling in the first EGR cooler 14 by air drawn into the air line 16 via latter's inlet aperture 31a in front portion 1a of the vehicle by an ejector pump device 31. In other respects this embodiment corresponds to that depicted in FIG. 1.

The invention is in no way limited to the embodiments described above but may be varied freely within the scopes of the claims.

The invention claimed is:

1. An arrangement for cooling of recirculating exhaust gases of a combustion engine in a vehicle having an exhaust line configured for leading exhaust gases out from the combustion engine, a turbine arranged in the exhaust line, an exhaust-treating component arranged in the exhaust line at a location downstream of the turbine with respect to an exhaust flow direction in the exhaust line, and a return line configured for recirculating part of the exhaust gases in the exhaust line from a location upstream of the turbine to the combustion engine, the arrangement comprising:
    a first EGR cooler positioned and configured to subject the exhaust gases in the return line to a first step of cooling;
    an air driving device configured for driving air through the first EGR cooler and thus yielding warm air; and
    at least one second EGR cooler positioned in the return line and configured to subject the exhaust gases in the return line to a second step of cooling;
    an air line which starts at an air intake point at an outside of the vehicle and extends to the first EGR cooler, and the air line thereafter extends to a location of the exhaust line between the turbine and the exhaust-treating component, the air line is configured for leading the warm air from the first EGR cooler into the exhaust line at the location; and the first EGR cooler is dimensioned, configured and operable so that the warm air is warmed up in the first EGR cooler to a higher temperature than the temperature of the exhaust gases in the exhaust line downstream of the turbine.

2. An arrangement according to claim 1, wherein the driving device comprises a fan arranged in or close to the air line.

3. An arrangement according to claim 1, wherein the driving device comprises an ejector pump device arranged in the exhaust pipe at said location close to an outlet aperture of the air line.

4. An arrangement according to claim 1, wherein the air line comprises an inlet located and configured such that air is drawn in and led to the EGR cooler from a region with air at a temperature of the surroundings.

5. An arrangement according to claim 4, wherein the air line inlet is situated in a wheel housing of the vehicle.

6. An arrangement according to claim 4, wherein the air line inlet is situated at a front portion of the vehicle.

7. An arrangement according to claim 1, wherein the exhaust-treating component comprises a catalyst.

8. An arrangement according to claim 1, wherein the exhaust-treating component comprises a particle filter.

9. An arrangement according to claim 1, further comprising a second EGR cooler positioned downstream of the first EGR cooler and configured to subject the recirculating exhaust gases to a second step of cooling by a cooling system having coolant from the combustion engine's cooling system.

10. An arrangement according to claim 9, further comprising a third EGR cooler positioned downstream of the first EGR cooler and configured to subject the recirculating exhaust gases to a third step of cooling by coolant which during normal operation of the combustion engine is at a lower temperature than coolant in the combustion engine's cooling system.

11. The arrangement according to claim 1, wherein the arrangement comprises the combustion engine, the exhaust line, the turbine, the exhaust-treating component and the return line.

12. The vehicle comprising the arrangement of claim 11.

13. The arrangement according to claim 3, wherein the ejector pump device comprises:
an exhaust gas passage; and
a nozzle positioned inside the exhaust gas passage,
wherein the outlet aperture of the air line is positioned in the exhaust gas passage downstream of the nozzle in the exhaust flow direction.

14. The arrangement according to claim 13, wherein the exhaust gas passage comprises a low pressure region downstream of the nozzle, and the outlet aperture of the air line is positioned in the low pressure region.

15. The arrangement according to claim 14, wherein the exhaust gas passage comprises a converging point downstream of the low pressure region, the converging point providing an internal diameter for the exhaust gas passage that is smaller than an internal diameter of the exhaust gas passage at the low pressure region.

16. The arrangement according to claim 15, wherein the exhaust gas passage further comprises an area of gradually increasing internal diameter positioned downstream of the converging point.

17. The arrangement according to claim 1, wherein the first portion of the air line is free of any compressor and the first portion of the air line not exposing the air to any compressor.

* * * * *